United States Patent
Toyoda et al.

(10) Patent No.: US 8,910,976 B2
(45) Date of Patent: Dec. 16, 2014

(54) STEERING APPARATUS FOR VEHICLE

(71) Applicants: Makoto Toyoda, Kariya (JP); Shinya Morinaga, Chiryu (JP)

(72) Inventors: Makoto Toyoda, Kariya (JP); Shinya Morinaga, Chiryu (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 266 days.

(21) Appl. No.: 13/626,326

(22) Filed: Sep. 25, 2012

(65) Prior Publication Data

US 2013/0075190 A1 Mar. 28, 2013

(30) Foreign Application Priority Data

Sep. 26, 2011 (JP) ................... 2011-208392

(51) Int. Cl.
*B62D 1/18* (2006.01)
*B62D 1/181* (2006.01)

(52) U.S. Cl.
CPC ..................... *B62D 1/181* (2013.01)
USPC ............................ 280/775; 74/493

(58) Field of Classification Search
CPC ....................................................... B62D 1/181
See application file for complete search history.

(56) References Cited

U.S. PATENT DOCUMENTS

| | | | |
|---|---|---|---|
| 4,633,732 A | 1/1987 | Nishikawa et al. | |
| 2005/0011297 A1 | 1/2005 | Oshita et al. | |
| 2005/0081675 A1 | 4/2005 | Oshita et al. | |
| 2006/0266151 A1* | 11/2006 | Avers et al. | 74/492 |
| 2008/0216597 A1* | 9/2008 | Iwakawa et al. | 74/493 |
| 2011/0215560 A1 | 9/2011 | Born et al. | |
| 2013/0074638 A1* | 3/2013 | Morinaga | 74/493 |
| 2013/0098193 A1* | 4/2013 | Morinaga et al. | 74/493 |

FOREIGN PATENT DOCUMENTS

JP  2005-153849 A  6/2005

OTHER PUBLICATIONS

Extended European Search Report issued Jan. 13, 2013, by the European Patent Office in corresponding European Patent Application No. 12185836.9. (4 pages).

* cited by examiner

*Primary Examiner* — Ruth Ilan
(74) *Attorney, Agent, or Firm* — Buchanan Ingersoll & Rooney PC

(57) ABSTRACT

A steering apparatus for a vehicle provided with a steering wheel includes a main housing, a movable column member, a fixing bracket fixing the main housing to a vehicle body, a link mechanism, and a drive mechanism connected to the link mechanism, wherein the drive mechanism includes a motor, a threaded shaft, and a nut member moving in an axial direction of the threaded shaft, the nut member includes a female threaded portion threadedly engaged with the threaded shaft and a pivot shaft portion including a rotational axis orthogonal to an axis of the female threaded portion and including two flat surface portions being parallel to the rotational axis and facing each other while leaving a predetermined distance therebetween, and the link mechanism includes a bearing portion including a bearing hole and a cut-out portion including two flat surfaces configured to be parallel to the two flat surface portions.

3 Claims, 7 Drawing Sheets

US 8,910,976 B2

STEERING APPARATUS FOR VEHICLE

CROSS REFERENCE TO RELATED APPLICATIONS

This application is based on and claims priority under 35 U.S.C. §119 to Japanese Patent Application 2011-208392, filed on Sep. 26, 2011, the entire content of which is incorporated herein by reference.

TECHNICAL FIELD

This disclosure generally relates to a steering apparatus for a vehicle.

BACKGROUND DISCUSSION

A known steering apparatus, which includes a tilt mechanism where a steering column is pivotably supported relative to a vehicle body and an operation position of a steering wheel is adjustable, is disclosed in JP2005-153849A (hereinafter referred to as Patent reference 1). According to the steering apparatus disclosed in Patent reference 1, a general connecting structure connecting links, where the links and sliders constituting a tilt mechanism are connected to one another by means of pivots (pivot screws), is disclosed. According to the known steering apparatus disclosed in Patent reference 1, a length between a column pivoting center and a column supporting point is suggested to be thirty percent or longer in terms of the length relative to a length between the column pivoting center and the steering wheel, however, the aforementioned lengths are not directly relevant to this disclosure.

According to the known steering apparatus disclosed in Patent reference 1, in a link mechanism that constitutes the tilt mechanism, the pivot screw is fitted by insertion in a hole formed on a link member so as to serve as a pivot axis, as is similar to conventional tilt mechanisms. According to the known steering apparatus disclosed in Patent reference 1, connections are established by using the pivot screws in order to assemble a drive mechanism including, for example, an electric motor. Accordingly, the number of parts and an assembling workload are large, which may result in cost increase.

A need thus exists for a steering apparatus for a vehicle, which is not susceptible to the drawback mentioned above.

SUMMARY

According to an aspect of this disclosure, a steering apparatus for a vehicle provided with a steering wheel includes a main housing including a first end portion and a second end portion, and supported in a manner that the main housing is pivotable relative to a vehicle body about a pivoting center at the first end portion, a movable column member accommodated and supported in the main housing in a movable manner in a front-rear direction of the vehicle body, and connected to the steering wheel, a fixing bracket fixing the second end portion of the main housing to the vehicle body in a state where the fixing bracket supports the second end portion in a manner that the second end portion is movable in an up-down direction of the vehicle body relative to the vehicle body, a link mechanism including a first end portion and a second end portion, the first end portion of the link mechanism being supported by the fixing bracket, and a drive mechanism connected to the second end portion of the link mechanism, wherein the drive mechanism includes a motor, a threaded shaft pivotably supported by the second end portion of the main housing and rotated by driving of the motor, and a nut member moving in an axial direction of the threaded shaft in response to rotation of the threaded shaft, the nut member includes a female threaded portion threadedly engaged with the threaded shaft, and a pivot shaft portion including a rotational axis that is orthogonal to an axis of the female threaded portion and including two flat surface portions which are parallel to the rotational axis and which face each other and are away from each other by a predetermined distance, the link mechanism includes a bearing portion provided at the second end portion of the link mechanism and including a bearing hole rotatably supporting the pivot shaft portion, the bearing portion includes a cut-out portion opening from the bearing hole in a direction which is orthogonal to the rotational axis and including two flat surfaces configured to be parallel to the two flat surface portions, and an operation position of the steering wheel at least in the up-down direction of the vehicle body is adjusted in a case where the main housing pivots via the link mechanism in response to driving of the drive mechanism.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
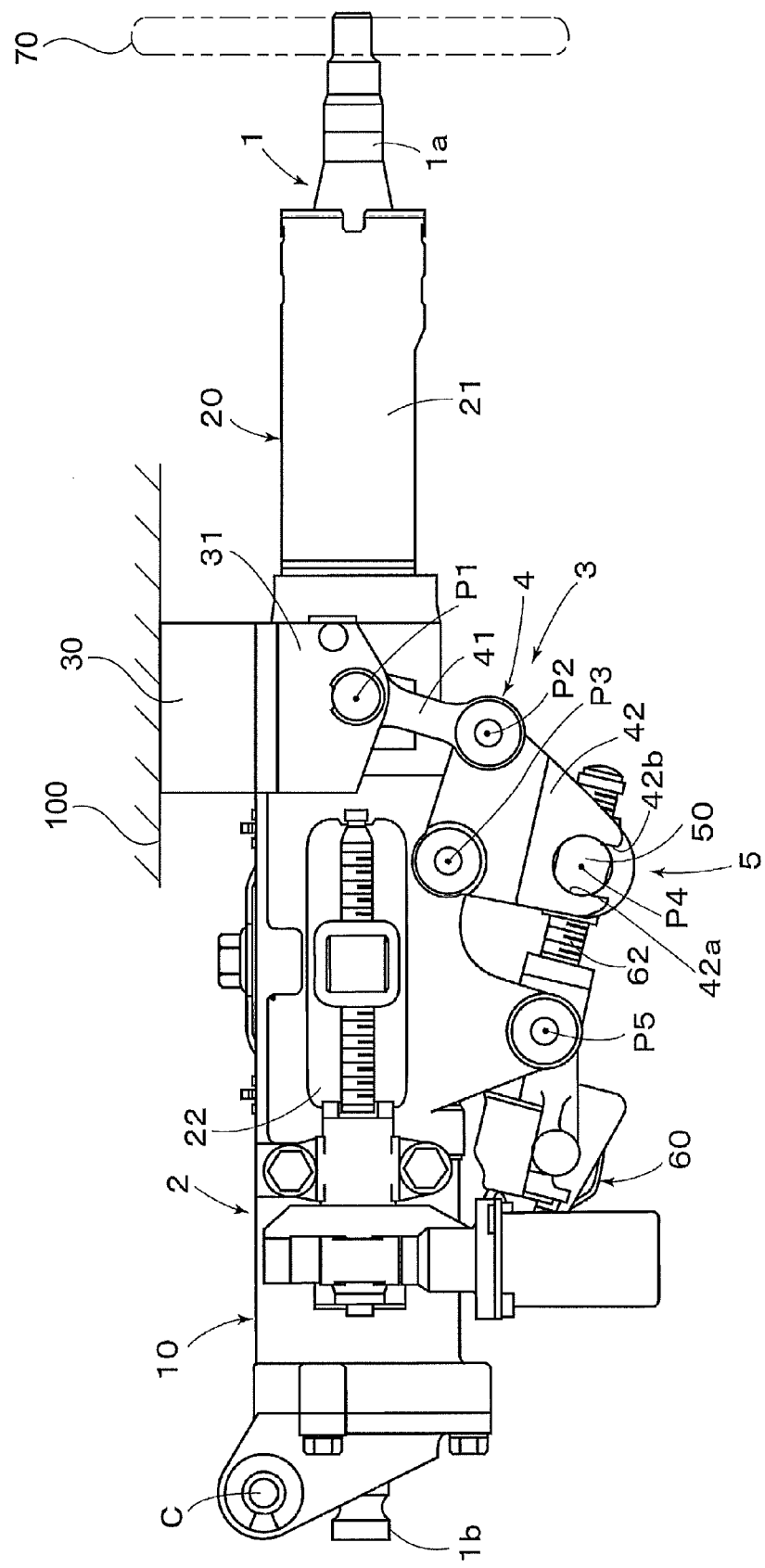
FIG. 1 is a side view illustrating a steering apparatus according to first embodiment disclosed here.

A first embodiment of this disclosure will be explained hereunder with reference to the drawings. As illustrated in FIG. 1, according to a steering apparatus for a vehicle of the embodiment, a steering shaft 1 includes an upper shaft 1a formed in a tubular form and a lower shaft 1b that is spline-fitted to a front end portion of the upper shaft 1a. A steering wheel 70 is connected to a rear end portion of the upper shaft 1a. In other words, the upper shaft 1a and the lower shaft 1b are connected such that the upper shaft 1a and the lower shaft 1b may move relative to each other in an axial direction thereof. A front end portion of the lower shaft 1b is connected to a steering mechanism. The steering mechanism is driven to steer vehicle wheels via a wheel steering mechanism in response to an operation of the steering wheel 70.

A main housing 10 including a first end portion and a second end portion is arranged coaxially with the steering shaft 1, and is supported in a manner that the main housing 10 is pivotable about a pivoting center C relative to a vehicle body 100. At the same time, the main housing 10 is retained by a fixing bracket 30. The fixing bracket 30 includes a pair of retaining portions 31 facing each other and extending in a downward direction of the vehicle. In FIG. 1, one of the pair of retaining portions 31 is illustrated. The main housing 10 is retained between the pair of retaining portions 31 so that the main housing 10 is fixed to the vehicle body 100 as illustrated in an upper portion of FIG. 1. Further, a thrust mechanism is placed between each of the retaining portions 31 of the fixing bracket 30 and the main housing 10. With the thrust applied by the thrust mechanism, the main housing 10 is slidably supported to the fixing bracket 30.

Within the main housing 10, a movable column member 20 is retained such that the movable column member 20 is movable in an axial direction thereof, that is, in a front-rear direction of the vehicle body 100. The movable column member 20 includes an inner tube 21 made of metal and an outer tube 22 made of metal. The inner tube 21 accommodates and retains a steering shaft 1 such that the steering shaft 1 is rotatable about the axis. The outer tube 22 accommodates the inner tube 21. In an ordinary situation, the outer tube 22 retains the inner tube 21 at a predetermined position. The inner tube 21 is referred to also as an upper tube. The outer tube 22 is referred to also as a telescopic tube. The upper shaft 1a is rotatably supported at a rear end portion of the inner tube 21 via a bearing. A relative movement in the axial direction between the upper shaft 1a and the inner tube 21 is restricted. Accordingly, the upper shaft 1a and the inner tube 21 are configured to be movable integrally with each other in the axial direction.

Thus, a telescopic mechanism 2 is configured such that the outer tube 22, the inner tube 21, the steering shaft 1, and the steering wheel 70 are movable integrally with one another in the axial direction relative to the main housing 10, so that the steering wheel 70 is adjusted to an intended position in the front-rear direction of the vehicle body 100. The telescopic mechanism 2 is configured to allow a relative movement of the inner tube 21 (accordingly a relative movement of the upper shaft 1a) in the axial direction relative to the outer tube 22 in a case where the steering shaft 1 is applied with a load equal to or greater than a predetermined value. In other words, the inner tube 21 and the outer tube 22 function as an energy absorbing means together with, for example, an annular frictional member (for example, a resilient bush made of metal), which is placed between the inner tube 21 and the outer tube 22.

On the other hand, a first end portion of a link mechanism 4 is supported by the fixing bracket 30 and a second end portion of the link mechanism 4 is connected to a drive mechanism 5, so that the drive mechanism 5 is pivotably supported at the movable column member 20. Thus, a tilt mechanism 3 is configured in a manner that the drive mechanism 5 allows, via the link mechanism 4, the movable column member 20 to move relative to the vehicle body 100. Accordingly, the steering wheel 70 is adjusted to an intended position in an up-down direction of the vehicle body 100. As illustrated in FIG. 1, according to the link mechanism 4 of the embodiment, an upper end portion of a first link (constituted by a pair of link members 41) is supported at a lower portion of the fixing bracket 30 to be rotatable about a pivot axis P1, and a lower end portion of the first link is supported at upper rear end portions of a pair of arm portions 421, 422 (refer to FIG. 3) of a second link (constituted by a link member 42) to be rotatable about a pivot axis P2. As used herein, the terms "front", "rear", "upper", "lower" and derivatives thereof related to the steering apparatus are based on the front-rear and up-down directions of the vehicle in a state where the steering apparatus is mounted on the vehicle.

Figure 2:
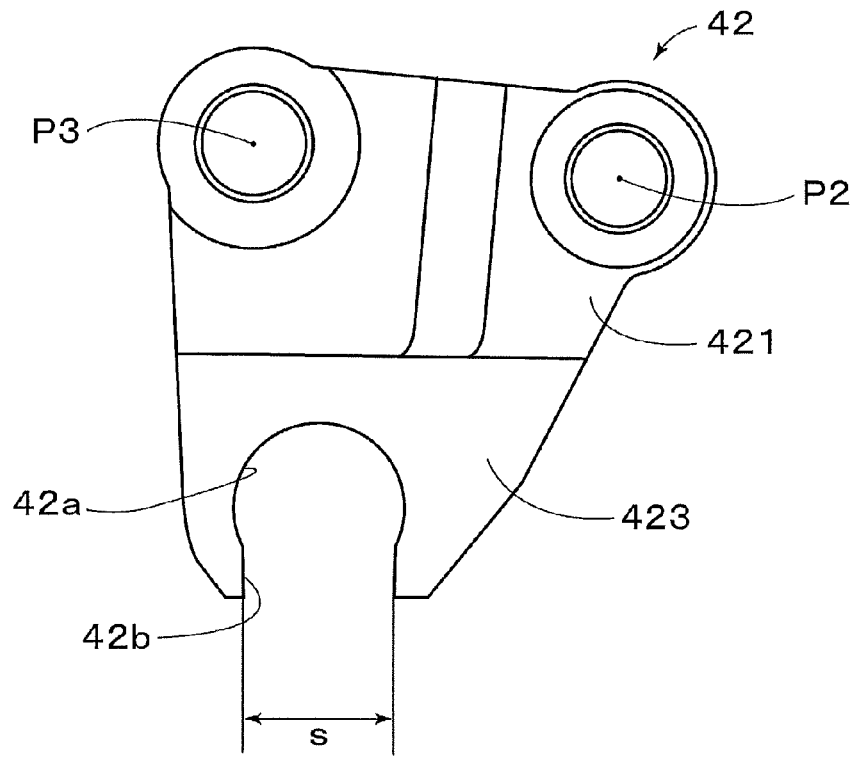
FIG. 2 is a side view illustrating a link member of the first embodiment.
Figure 3:
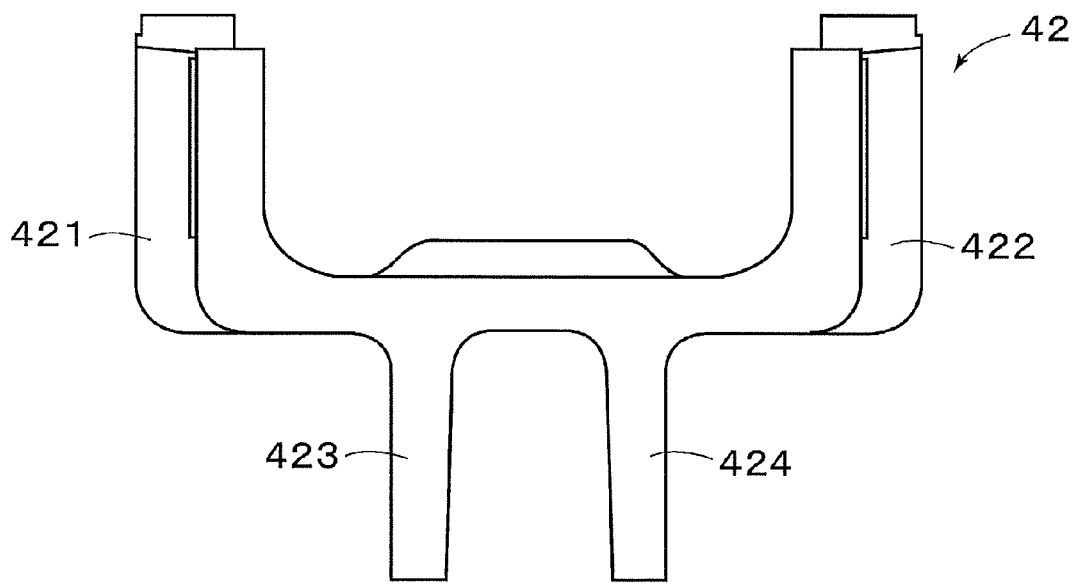
FIG. 3 is a front view illustrating the link member of the first embodiment.

The link member 42 constituting the second link is formed in a shape of a bell crank as illustrated in FIGS. 2 and 3 in enlarged scales. The link member 42 is supported at a lower portion of the main housing 10 to be pivotable about a pivot axis P3 in a manner that the main housing 10 is held between upper front end portions of the pair of arm portions 421, 422, and the link member 42 is supported to be pivotable about a pivot axis P4 in a manner that a nut member 50 is held between a pair of leg portions 423, 424 of the second link (the link member 42). The nut member 50 is also referred to as a tilt nut or a tilt slider, and constitutes, together with, for example, a threaded shaft 62, the drive mechanism 5 serving as a drive source of the tilt mechanism 3. The link members 41, 42, the drive mechanism 5, the movable column member 20 and the main housing 10 are connected to one another by press-fitting pivot pins or by screwing pivot screws. Each of the pivot axis P1 and a pivot axis P5 is constituted by the pivot pin, each of the pivot axis P2 and the pivot axis P3 is constituted by the pivot screw, and the pivot axis P4 is constituted by the nut member 50. The threaded shaft 62 is pivotably supported by the second end portion of the main housing 10.

Thus, the steering apparatus of the embodiment is configured such that in a case where the nut member 50 moves in an axial direction of the threaded shaft 62 as the threaded shaft 62 is driven to rotate by an electric motor 60 serving as a motor, the second link (the link member 42) pivots about the pivot axis P3 and the first link (the link member 41) pivots about the pivot axis P1, so that the main housing 10 (together with the outer tube 22, the inner tube 21, the upper shaft 1a and the steering wheel 70) moves in the up-down direction of the vehicle body 100 relative to the vehicle body 100. In the embodiment, a speed reduction mechanism is arranged between an output shaft of the electric motor 60 and the threaded shaft 62, and thus the output, that is, the number of rotations, of the electric motor 60 is appropriately decelerated before being transmitted to the threaded shaft 62.

Figure 4:
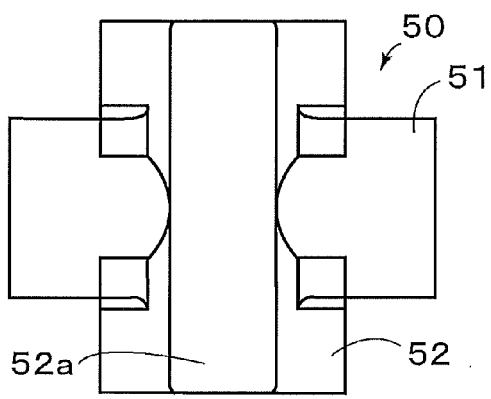
FIG. 4 is a plan view illustrating a nut member of the first embodiment.

As illustrated in FIGS. 4 to 7, the nut member 50 of the embodiment includes a female threaded portion 51 screwed onto or threadedly engaged with the threaded shaft 62 constituted to include trapezoidal screw thread, and a pivot shaft portion 52 functioning as the pivot axis P4. The nut member 50 is made of resin and is formed in a cross shape in a plan view as illustrated in FIG. 4. In other words, the pivot shaft portion 52 includes a rotational axis (serving as the pivot axis P4 in FIG. 1) which is orthogonal to an axis of the female threaded portion 51. The pivot shaft portion 52 includes two flat surface portions 52a, 52b which are formed to be parallel to the rotational axis and which face each other while leaving a predetermined distance therebetween. That is, the two flat surface portions 52a, 52b are away from each other by the predetermined distance. On the other hand, as illustrated in FIG. 2, each of the leg portions 423, 424 of the link member 42 constituting the second link serves as a bearing portion rotatably supporting the pivot shaft portion 52. Each of the leg portions 423, 424 is formed with a bearing hole 42a and a cut-out portion 42b. The cut-out portion 42b opens from the bearing hole 42a in a direction orthogonal to the rotational axis, that is, the cut-out portion 42b is formed continuously from the bearing hole 42a. Each cut-out portion 42b includes two flat surfaces, and the two flat surfaces are configured to be parallel to the two flat surface portions 52a, 52b of the pivot shaft portion 52 before and during assembly as described later.

Figure 5:
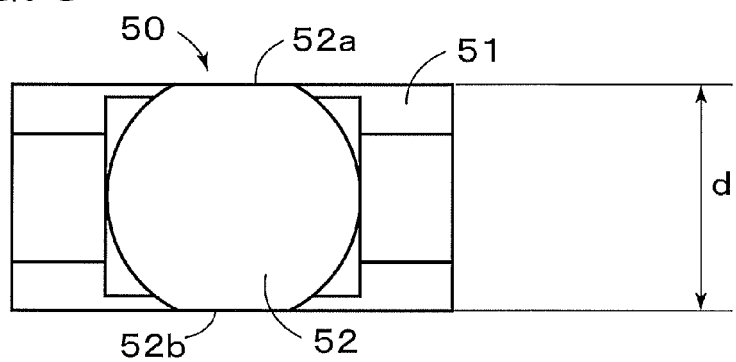
FIG. 5 is a side view illustrating the nut member of the first embodiment.
Figure 6:
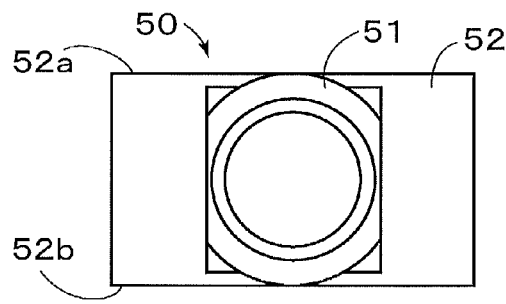
FIG. 6 is a front view illustrating the nut member of the first embodiment.
Figure 7:
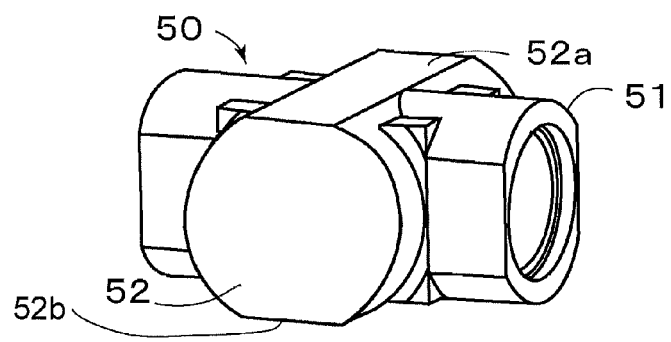
FIG. 7 is a perspective view illustrating the nut member of the first embodiment.

An opening width (that is, a width-across-flats s illustrated in FIG. 2, which serves as a distance between the two flat surfaces) of the cut-out portion 42b is set to be smaller than an inner diameter of the bearing hole 42a and to be slightly greater than a dimension between the two flat surface portions 52a, 52b of the pivot shaft portion 52 (that is, a width-across-flats d illustrated in FIG. 5, which serves as a predetermined distance). This allows the two flat surface portions 52a, 52b of the pivot shaft portion 52 to be inserted in the bearing hole 42a via the cut-out portion 42b. The inner diameter of the bearing hole 42a is set to be slightly greater than an outer diameter of the pivot shaft portion 52 so that the pivot shaft portion 52 fits in the bearing hole 42a. Consequently, a clearance is generated between the pivot shaft portion 52 and the bearing hole 42a. In a case where the clearance is at an extent that is not overlooked, a coating may be provided at an outer peripheral surface of the pivot shaft portion 52 so that an appropriate connecting state is maintained. Further, in a case where the clearance between the pivot shaft portion 52 and the bearing hole 42a is large and there is a concern that shakiness or looseness may result from the aforementioned large clearance, a bush may be interposed between the pivot shaft portion 52 and the bearing hole 42a.

Figure 8:
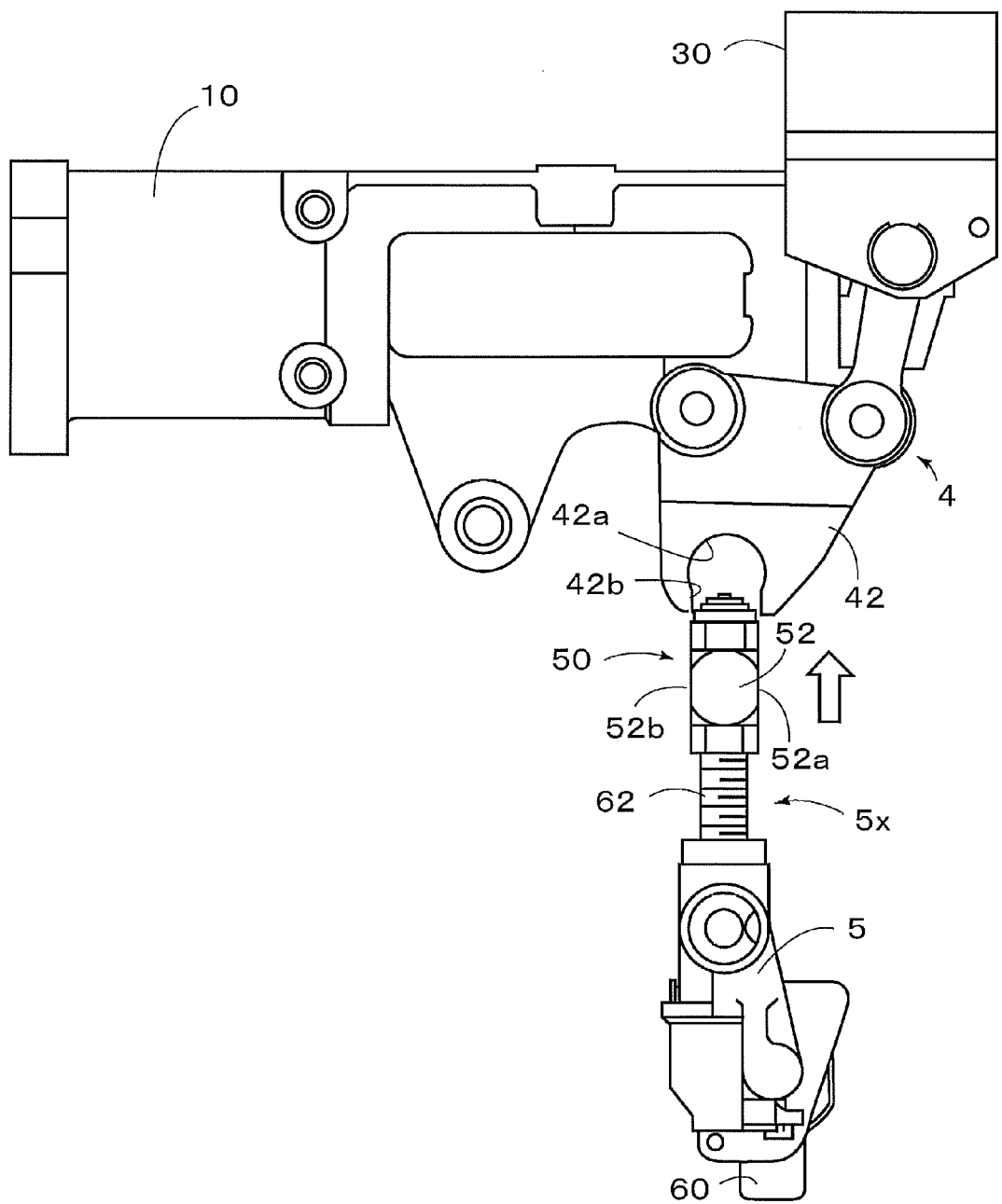
FIG. 8 is a side view illustrating a state where a tilt mechanism of the first embodiment is assembled.
Figure 9:
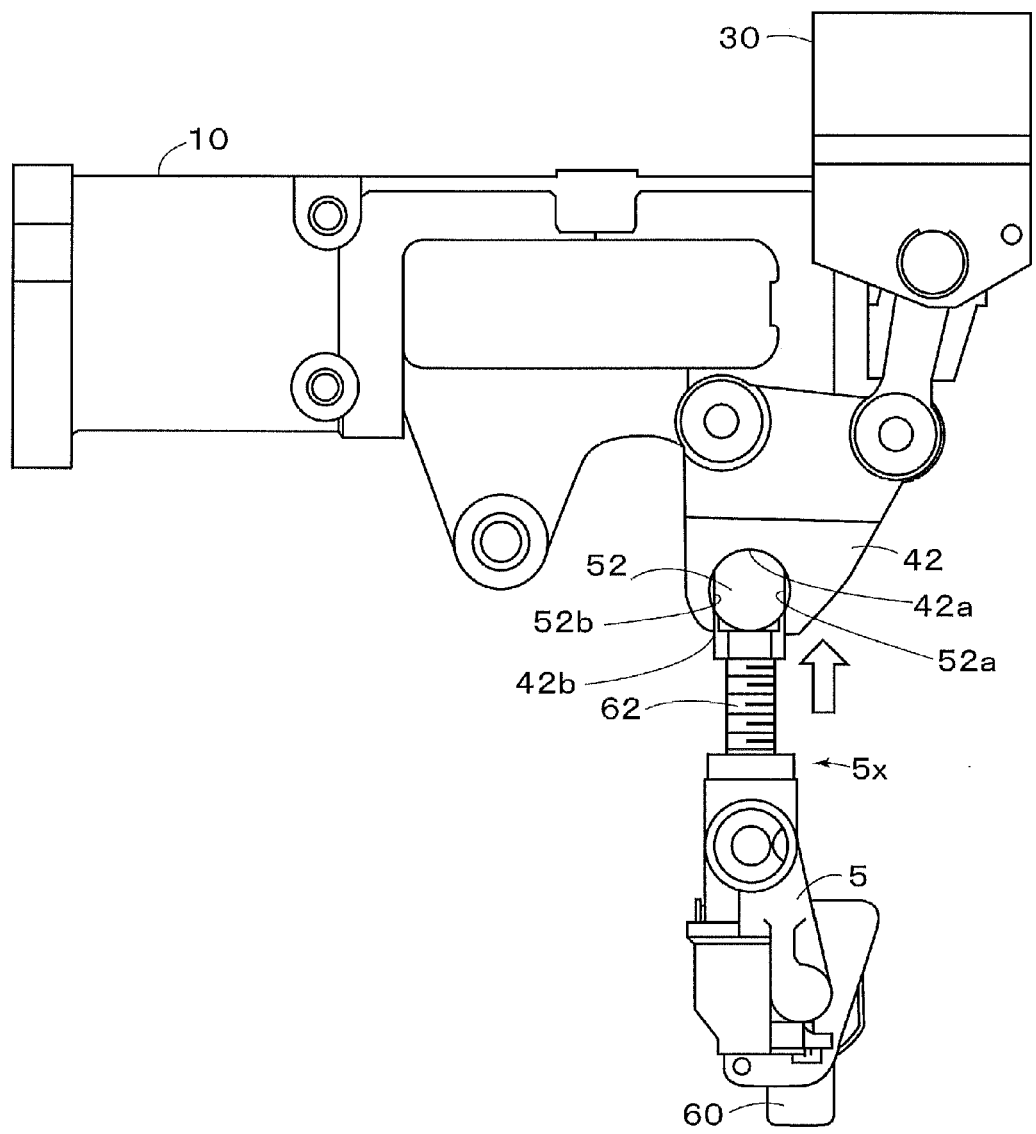
FIG. 9 is a side view illustrating a state where the tilt mechanism of the first embodiment is assembled.
Figure 10:
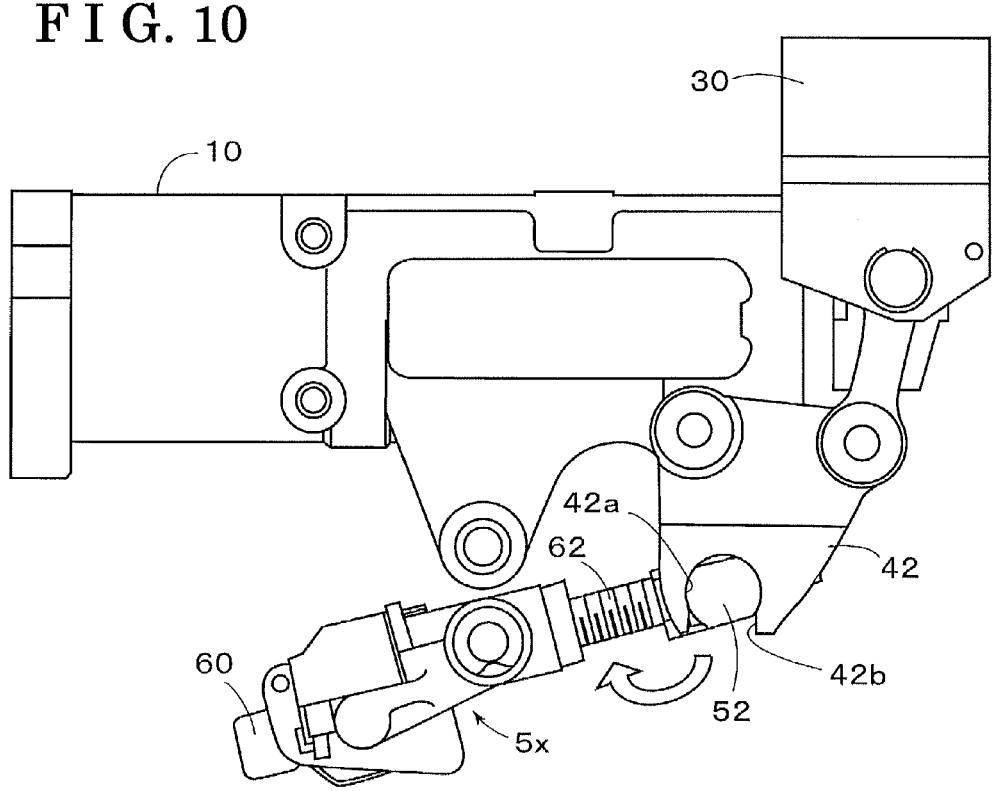
FIG. 10 is a side view illustrating a state where the tilt mechanism of the first embodiment is assembled.

A state or manner in which the tilt mechanism 3 is assembled will be explained with reference to FIGS. 8 to 10. First, the drive mechanism 5 including, for example, the nut member 50 and the threaded shaft 62, is prepared as a subassembly, that is, a tilt drive unit 5x, and the link mechanism 4 is attached to the main housing 10 as illustrated in FIG. 8. Next, the tilt drive unit 5x is assembled on the main housing 10 from below and the flat surface portions 52a, 52b of the pivot shaft portion 52 are inserted in an inside of the bearing hole 42a via the cut-out portion 42b as illustrated in FIG. 8 and the pivot shaft portion 52 fits in the bearing hole 42a, and therefore a state illustrated in FIG. 9 is established. In this state (that is, the state where the pivot shaft portion 52 is fitted in the bearing hole 42a), the tilt drive unit 5x is rotated as illustrated in FIG. 10 so that a portion of the tilt drive unit 5x, the portion including the electric motor 60, is moved in the front direction of the vehicle body 100 (that is, in the left direction in FIG. 10). This causes the pivot shaft portion 52 to rotate in the inside of the bearing hole 42a. By press-fitting the pivot pins constituting the pivot axis P5 in the main housing 10 from both sides respectively, the tilt drive unit 5x is pivotably supported in a state where the tilt drive unit 5x is in a predetermined position as illustrated in FIG. 11.

Figure 11:
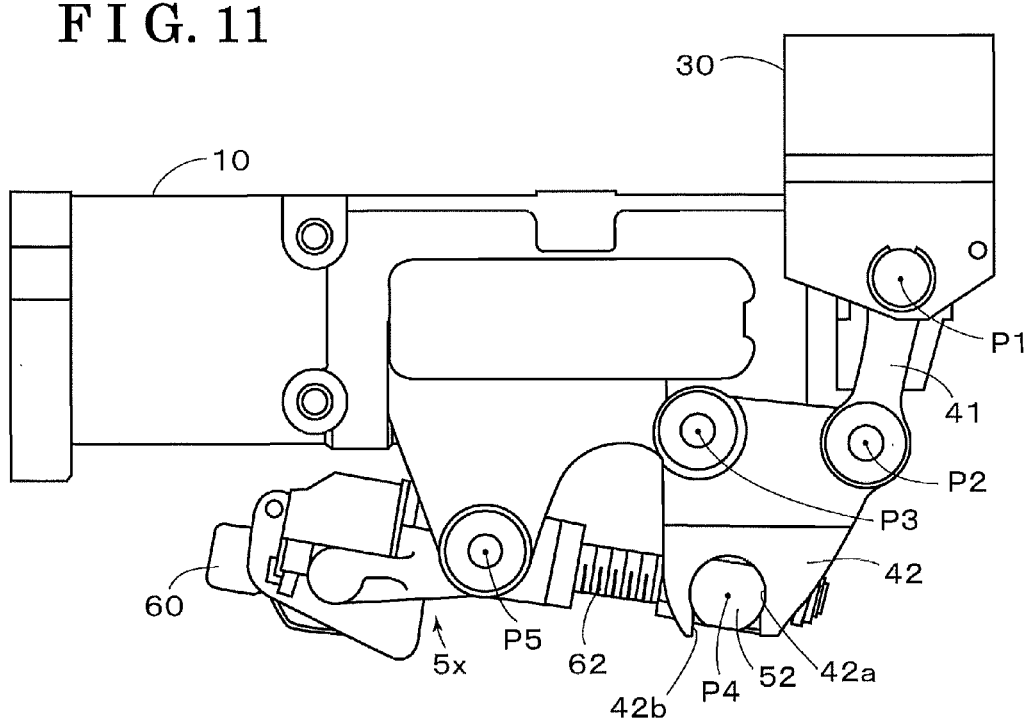
FIG. 11 is a side view illustrating a state where the assembly of the tilt mechanism of the first embodiment is completed.

Thus, the tilt mechanism 3 is brought to be in an initial position illustrated in FIGS. 1 and 11. When the tilt mechanism 3 is in the initial position, even in a case where the nut member 50 is driven to move and the link mechanism 4, which is operatively connected to the nut member 50, is driven to move, there is no concern that the pivot shaft portion 52 comes off and falls out of the bearing hole 42a (via the cut-out portion 42b). Specifically, because the nut member 50 moves along the threaded shaft 62, a direction of the movement of the nut member 50 is limited to a front-rear direction of the bearing hole 42a, and therefore a state in which the two flat surface portions 52a, 52b of the pivot shaft portion 52 fit in or conform to the cut-out portion 42b provided at a lower side of the bearing hole 42a does not occur. In addition, after the assembly, a thrust of the threaded shaft 62 caused by the electric motor 60 relative to the nut member 50 acts only in the axial direction and most of a mass of the steering apparatus (including a mass of the steering wheel 70) acts only in the axial direction of the threaded shaft 62 via the link mechanism 4. Accordingly, a load in the axial direction which is applied via the female threaded portion 51 to the pivot shaft portion 52 is received at inner surfaces of the bearing hole 42a which are orthogonal to the cut-out portion 42b, and thus a sufficient pressure-receiving area is ensured. Consequently, there is no concern that the nut member 50 comes off and falls out, and there is no need to concern about a lack of rigidity.

In order to actuate the tilt mechanism 3 having the aforementioned configuration, in a state illustrated in FIG. 1, the electric motor 60 is started so that the output shaft thereof is driven to rotate. The rotation of the output shaft is decelerated via the speed reduction mechanism and then transmitted to the threaded shaft 62, thereby causing the nut member 50 screwed onto or threadedly engaged with the threaded shaft 62 to move in the axial direction so that the link mechanism 4 is driven to move. That is, the second link (the link member 42) pivots about the pivot axis P3, the first link (the link member 41) pivots about the pivot axis P1, and the main housing 10 (together with the outer tube 22, the inner tube 21, the upper shaft 1a and the steering wheel 70) pivots. By stopping the electric motor 60 when the steering wheel 70 is brought to be at the intended position in the up-down direction of the vehicle body 100, the steering wheel 70 is adjusted to the intended position. According to the embodiment, the electric motor 60 is arranged at a forward portion of the vehicle body 100 relative to the pivot shaft portion 52. Consequently, it is restricted that the electric motor 60 is in contact with knees of an occupant of the vehicle.

Figure 12:
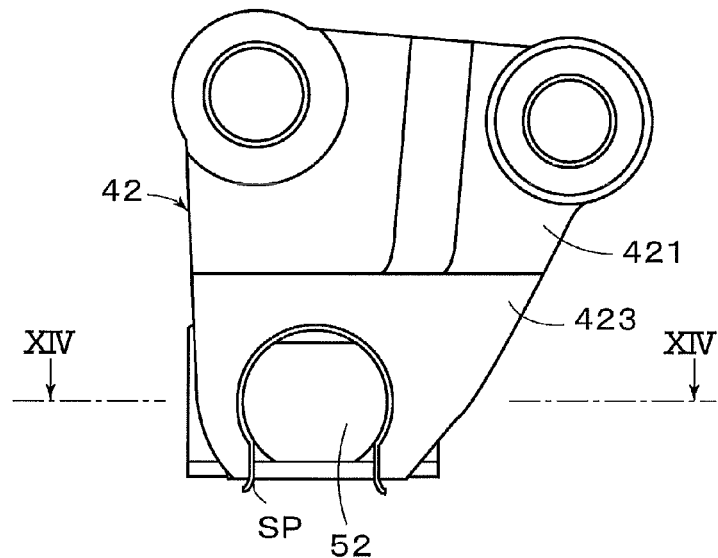
FIG. 12 is a side view illustrating a state where a nut member and a link member of a second embodiment are assembled.
Figure 13:
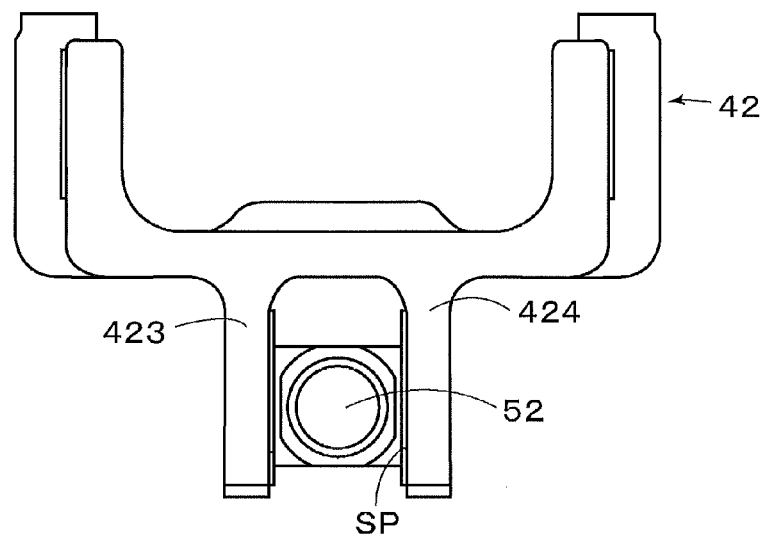
FIG. 13 is a front view illustrating a state where the nut member and the link member of the second embodiment are assembled.
Figure 14:
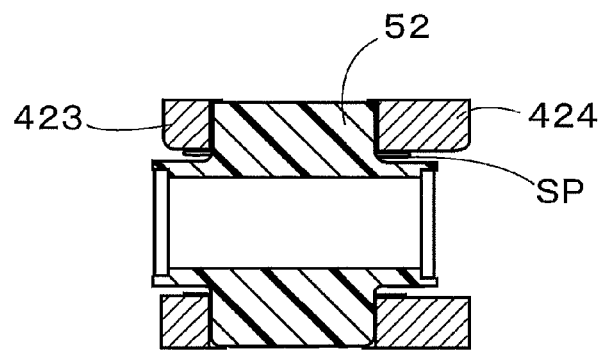
FIG. 14 is a cross-sectional view taken along line XIV-XIV in FIG. 12.

A second embodiment of this disclosure will be explained hereunder with reference to the drawings. By arranging a bush SP serving as an elastic member between the nut member 50 and the link member 42 as illustrated in FIGS. 12 to 14, the shakiness or looseness resulting from the clearance in a radial direction of the pivot shaft portion 52 generated between the pivot shaft portion 52 of the nut member 50 and the leg portions 423, 424 of the link member 42 is appropriately relieved. For example, as illustrated in FIG. 12, the bush SP formed in a shape of a letter of omega may be press-fitted between the pivot shaft portion 52 and the leg portions 423, 424, and thus a high assembly performance is ensured by using an inexpensive part. Other structures of the second embodiment are identical to those of the first embodiment, and explanations will not be repeated.

According to the embodiments, the steering apparatus for the vehicle provided with the steering wheel 70 includes the main housing 10 including the first end portion and the second end portion, and supported in a manner that the first end portion of the main housing 10 is pivotable relative to the vehicle body 100 about the pivoting center C, the movable column member 20 accommodated and supported in the main housing 10 in a movable manner in the front-rear direction of the vehicle body 100, and connected to the steering wheel 70, the fixing bracket 30 fixing the second end portion of the main housing 10 to the vehicle body 100 in a state where the fixing bracket 30 supports the second end portion in a manner that the second end portion is movable in the up-down direction of the vehicle body 100 relative to the vehicle body 100, the link mechanism 4 including the first end portion and the second end portion, the first end portion of the link mechanism 4 being supported by the fixing bracket 30, and the drive mechanism 5 connected to the second end portion of the link mechanism 4, wherein the drive mechanism 5 includes the electric motor 60, the threaded shaft 62 pivotably supporting the second end portion of the main housing 10 and rotated by driving of the electric motor 60, and the nut member 50 moving in the axial direction of the threaded shaft 62 in response to the rotation of the threaded shaft 62, the nut member 50 includes the female threaded portion 51 screwed onto the threaded shaft 62, and the pivot shaft portion 52 including the rotational axis that is orthogonal to the axis of the female threaded portion 51 and including the two flat surface portions 52a, 52b which are parallel to the rotational axis and which face each other while leaving the width-across-flats d therebetween, the link mechanism 4 includes the leg portions 423, 424 provided at the second end portion of the link mechanism 4 and including the bearing hole 42a rotatably supporting the pivot shaft portion 52, the leg portions 423, 424 includes the cut-out portion 42b opening from the bearing hole 42a in a direction which is orthogonal to the rotational axis and including the two flat surfaces configured to be parallel to the two flat surface portions 52a, 52b, and the operation position of the steering wheel 70 at least in the up-down direction of the vehicle body 100 is adjusted in a case where the main housing 10 pivots via the link mechanism 4 in response to driving of the drive mechanism 5.

According to the above-described structure, the drive mechanism 5 of the steering apparatus of the embodiments includes the threaded shaft 62 pivotably supporting the second end portion of the main housing 10 and driven by the electric motor 60 to rotate, and the nut member 50 moving in the axial direction in response to the rotation of the threaded shaft 62. The nut member 50 includes the female threaded portion 51 screwed onto the threaded shaft 62 and the pivot shaft portion 52 including the rotational axis orthogonal to the axis of the female threaded portion 51 and the two flat surface portions 52a, 52b which are parallel to the rotational axis and which face each other while leaving the width-across-flats d therebetween. The link mechanism 4 includes the leg portions 423, 424 provided at the second end portion of the link mechanism 4 and each including the bearing hole 42a rotatably supporting the pivot shaft portion 52. Each of the leg portions 423, 424 includes the cut-out portion 42b opening from the bearing hole 42a in the direction which is orthogonal to rotational axis and including the two flat surfaces configured to be parallel to the two flat surface portions 52a, 52b. Consequently, a connecting structure connecting the drive mechanism 5 and the link mechanism 4 to each other includes a simple configuration that is easy to assemble. Further, the drive mechanism 5 and the link mechanism 4 are assembled easily by using a small number of parts. Thus, an assembling workload is reduced.

According to the embodiments, the width-across-flats s between the two flat surfaces of the cut-out portion 42b is greater than the width-across-flats d between the two flat surface portions 52a, 52b provided at the pivot shaft portion 52 of the nut member 50 and is smaller than the inner diameter of the bearing hole 42a, and the inner diameter of the bearing hole 42a is greater than the outer diameter of the pivot shaft portion 52.

According to the above-described structure, the nut member 50 is assembled on the link mechanism 4 easily and it is ensured that the nut member 50 moves and operates in a smooth way.

According to the embodiments, the electric motor 60 is arranged at a forward portion of the vehicle body 100 relative to the pivot shaft portion 52.

According to the above-described structure, the electric motor 60 is arranged at the forward portion of the vehicle body 100 relative to the pivot shaft portion 52. Consequently, it is restricted that the electric motor 60 is in contact with knees of an occupant of the vehicle.

The principles, preferred embodiments and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is

1. A steering apparatus for a vehicle provided with a steering wheel, the steering apparatus comprising:
    a main housing including a first end portion and a second end portion, and supported in a manner that the main housing is pivotable relative to a vehicle body about a pivoting center at the first end portion;
    a movable column member accommodated and supported in the main housing in a movable manner in a front-rear direction of the vehicle body, and connected to the steering wheel;
    a fixing bracket fixing the second end portion of the main housing to the vehicle body in a state where the fixing bracket supports the second end portion in a manner that the second end portion is movable in an up-down direction of the vehicle body relative to the vehicle body;
    a link mechanism including a first end portion and a second end portion, the first end portion of the link mechanism being supported by the fixing bracket; and
    a drive mechanism connected to the second end portion of the link mechanism, wherein
    the drive mechanism includes a motor, a threaded shaft pivotably supported by the second end portion of the main housing and rotated by driving of the motor, and a nut member moving in an axial direction of the threaded shaft in response to rotation of the threaded shaft,
    the nut member includes a female threaded portion threadedly engaged with the threaded shaft, and a pivot shaft portion including a rotational axis that is orthogonal to an axis of the female threaded portion and including two flat surface portions which are parallel to the rotational axis and which face each other and are away from each other by a predetermined distance,
    the link mechanism includes a bearing portion provided at the second end portion of the link mechanism and including a bearing hole rotatably supporting the pivot shaft portion, the bearing portion includes a cut-out portion opening from the bearing hole in a direction which is orthogonal to the rotational axis and including two flat surfaces configured to be parallel to the two flat surface portions, and
    an operation position of the steering wheel at least in the up-down direction of the vehicle body is adjusted in a case where the main housing pivots via the link mechanism in response to driving of the drive mechanism.

2. The steering apparatus for the vehicle provided with the steering wheel according to claim 1, wherein
    a distance between the two flat surfaces of the cut-out portion is greater than the predetermined distance between the two flat surface portions provided at the pivot shaft portion of the nut member and is smaller than an inner diameter of the bearing hole, and the inner diameter of the bearing hole is greater than an outer diameter of the pivot shaft portion.

3. The steering apparatus for the vehicle provided with the steering wheel according to claim 1, wherein the motor is arranged at a forward portion of the vehicle body relative to the pivot shaft portion.

\* \* \* \* \*